United States Patent Office 3,453,319
Patented July 1, 1969

3,453,319
GAS PHASE CHROMATOGRAPHIC SEPARATION OF LANTHANIDE RARE EARTH CHELATES
Kent J. Eisentraut, 642 Turnbull Road, Dayton, Ohio 45431, and Robert E. Sievers, 2628 N. Emerald Drive, Fairborn, Ohio 45324
No Drawing. Filed Nov. 14, 1966, Ser. No. 594,250
Int. Cl. C07f 5/00
U.S. Cl. 260—429.2        2 Claims

ABSTRACT OF THE DISCLOSURE

Selected rare earths are reacted with an organic ligand producing chleates, the chelates are placed in an organic solution and are positioned in the injection port of a gas-liquid chromatograph, wherein the chelates are separated as peaks on a recorder trace. The organic ligand may be 2,2,6,6-tetramethyl-3,5-heptanedione.

---

The invention described herein may be manufactured and used by or for the Government for governmental purposes without the payment to us of any royalty thereon.

This invention relates to a process for accomplishing the separation and the purification of the rare earth elements by gas-liquid chromatography using commercially available equipment.

The rare earth elements and their symbols in the order of their atomic numbers consist of scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Promethium (Pm) can also be included with this group, but it does not occur naturally due to its radioactivity.

The order of volatility of the rare earth chelates of the ligand 2,2,6,6-tetramethyl-3,5-heptanedione, hereinafter abbreviated H(thd) is about as follows:

Sc(thd)₃>Lu(thd)₃>Yb(thd)₃>Tm(thd)₃>
Er(thd)₃>Y(thd)₃>Ho(thd)₃>Dy(thd)₃>
Tb(thd)₃>Gd(thd)₃>Eu(thd)₃>Sm(thd)₃>
Nd(thd)₃>Pr(thd)₃>La(thd)₃ of the general designation herein as M(thd)₃.

Prior methods in solving the problem of separating and purifying the rare earths were based on ion-exchange separations that are time consuming and expensive. In comparison, the present invention permits the easy separation of rare earths in the form of volatile complexes and then the conversion of the complexes into compounds such as the oxides that are of specific interest.

The work described herein is the subject matter of papers in The Journal of The American Chemical Society, vol. 87, p. 5254, dated Nov. 20, 1965, and in Chemical and Engineering News, vol. 43, p. 39, dated Nov. 22, 1965, that may be regarded as being parts hereof. Suitable texts are: Treatise on Analytical Chemistry, vol. 3, 1961, p. 1658, Interscience Publishers, N.Y., and Gas Chromatography by Ambrose and Ambrose, D. Van Nostrand Co., Inc. Princeton, N.J., 1962.

All of the rare earth chelates are volatile and they are stable in the gas phase and can be separated using gas-liquid chromatography. By the use of the invention that is disclosed herein, very small quantities of one rare earth in the presence of another may be detected using sensitive detectors. Large scale quantities of the rare earth chelates can be separated and obtained using analytical and preparative-scale chromatography.

The present process takes advantage of the significant differences in the degree of volatility of stable rare earth chelates to achieve the separation of the chemically similar rare earth elements by gas-liquid chromatography. Patents Nos. 3,164,980, 3,146,616, 3,062,038 and 3,048,029 are illustrative of gas-liquid chromatography.

The use of rare earths in the preparation of materials that exhibit stability at high temperatures is of increasing importance. The process that is disclosed herein materially lowers the cost of isolating and purifying the rare earth elements. The volatile rare earth chelates can be converted into the pure, rare earth oxides by pyrolysis or by chemical reaction. Once the oxides are obtained, any desired rare earth compound can be produced from the oxides.

One object of the present invention is to accomplish the separation of the rare earth elements in substantially pure form.

Another object is to analyze rare earth products of nuclear fission.

Another object is to detect small quantities of one rare earth in the presence of larger quantities of other rare earths or of other elements or compounds using sensitive gas chromatographic detectors.

Another object is accomplishing the separation of Sc(III), Y(III) and all of the lanthanides from each other and from other compounds, (III) indicating valence.

A further object is in forming stable chelates of the rare earths that are volatile at temperatures of 100–200° C. and the separation of these chelates using gas-liquid chromatography.

The method that is contemplated hereby consists briefly of forming stable and volatile chelates of the designated rare earth elements and promethium with beta-diketone ligands; and injecting a solution of a mixture of these volatile rare earth chelates in an organic solvent, such as benzene, into a preferred commercially available gas chromatograph. The volatile chelates in their vapor phase are then separated on the gas chromatographic column. The transuranium elements are closely related chemically and physically with the rare earths and are within the concept of the present invention.

The method begins with synthesizing chosen volatile rare earth chelates using the organic ligand 2,2,6,6-tetramethyl-3,5-heptanedione or H(thd) or fluorocarbon or hydrocarbon derivatives thereof. The rare earth tris-chelates formed can be obtained in greater than 90% yields.

Following the synthesis of the desired selection of rare earth chelates, a mixture of the chelates to be separated is dissolved in an organic solvent such as benzene, and a portion of the solution is injected with a syringe into the heated sample injection port of a commercially available gas-liquid chromatographic instrument preferably having a column of Teflon (DuPont) containing 2% Apiezon H on 60–80 mesh Gas Pack F solid particles in the column.

The volatile rare earth chelates are separated on the column and emerge as distinct peaks at the detector and are presented as a trace on a recorder. With this procedure, samples of each separated complex are collected.

The described separation of the rare earths using gas chromatography takes advantage of the differences in vapor pressure of each chelate at a particular temperature and also takes advantage of the differences in solubility of each particular chelate in the gas chromatographic liquid phase at a specific temperature.

From the chromatograph heated sample injection port the volatile complexes are vaporized and are picked up by helium carrier gas. The vaporized complexes are swept by the helium carrier gas into the first plate of the gas chromatographic column. As the complexes pass through the column, they are separated and pass into the detector. As an individual chelate passes through the detector, it registers as a peak on the instrument recorder and also can be collected from the detector exit port in a chilled U-tube cold trap or the like.

Each of the rare earth-(thd)$_3$ complexes when injected singly into the gas chromatograph yields a single gas chromatographic peak, which when collected from the detector exit port is found to be identical with an authentic sample of the particular chelate. The volatile chelate tris(2,2,6,6-tetramethyl-3,5-heptanedionato)terbium is illustrative.

Sixty millimoles, or m. moles, of 2,2,6,6-tetramethyl-3,5-heptanedione, abbreviated H(thd), was dissolved in 30 cc. of 95% ethanol in a thick-walled flask fitted with a stopcock connected to a vacuum system. 60 m. moles of reagent NaOH was dissolved in 50 cc. of 50% ethanol and was added to the reactant flask. The reactants were continuously stirred with a magnetic stirrer.

Tb(NO$_3$)$_3$·6H$_2$O was prepared from 99.9% Tb$_4$O$_7$. Twenty m. moles of the Tb(NO$_3$)$_3$·6H$_2$O was dissolved in 50 cc. of 50% ethanol and added to the solution. Immediately the reaction flask was evacuated, was sealed, and was stirred for two hours. The volume of the solution was reduced by 50% by a reduced pressure distillation and then 350 cc. of distilled water was added to the solution. The Tb(thd)$_3$ which separated out was quickly vacuum filtered, dried and sublimed at a temperature of 180° C. and at a pressure of 0.05 mm. of mercury. The yield of sublimed product was 13.17 grams for a 92.9% yield. The sublimed crystals were recrystallized from reagent n-hexane in vacuo and were vacuum dried and had a melting point of 177° C. to 180° C. When the crystals of Tb(thd)$_3$ were irradiated by an ultraviolet lamp at 3660 Angstroms they emitted brilliant green fluorescence.

Other methods based on solvent extraction, ligand substitution reactions, etc., where preferred, may be used to accomplish the desired syntheses.

All of the above-listed rare earth elements have been converted experimentally into their appropriate volatile tris chelates of H(thd). All of these rare earth complexes are volatile and can be passed quantitatively into the gas phase intact without thermal degradation at low temperatures of, for example, from 100° C. to 200° C. Excellent elemental analyses have been obtained on these volatile rare earth chelates. Analyses of the rare earth chelates so made were determined and reported by the Galbraith Laboratories of Knoxville, Tenn. The rare earth chelates so made were also characterized by their ultraviolet visible, infrared and proton nuclear magnetic resonance spectra, as well as by thermal gravimetric analyses and by measuring their vapor pressure as a function of temperature.

This invention pertains to the method of purification and separation of the rare earth elements in the form of the above-described volatile chelates or similar derivatives, expressed as M(thd)$_3$ wherein M indicates one of each of the above-listed rare earth elements inclusive of promethium. From the inventors' physical data on these volatile chelates, they have noticed a reasonable and a significant difference in the degree of volatility of the various complexes. They have taken advantage of these differences in volatility to achieve separation of the individual rare earth elements of high purity from other rare earth elements using the method described herein.

Typical specific gas chromatographic separations of rare earth chelates such as the separation of Sc(thd)$_3$, Yb(thd)$_3$, Ho(thd)$_3$, and Eu(thd)$_3$ are displayed as crests on a graph of retention time along the abscissa and recorder response along the ordinate. This separation was effected experimentally using a column temperature of 157 °C., an injection port temperature of 228° C., and a thermal conductivity detector cell temperature of 232° C. The helium carrier gas flow rate was 100 cc. per minute.

A corresponding separation of Sc(thd)$_3$, Er(thd)$_3$, Eu(thd)$_3$, and Nd(thd)$_3$ was accomplished and displayed as crests on a graph with the same coordinates and using the above-described procedure using a column temperature of 185° C., an injection port temperature of 228° C., and a detector cell temperature of 232° C.

Large quantities of the rare earths can be separated on large diameter columns using preparative scale gas chromatography. Gas-solid chromatography functions in a similar manner except that repetitive adsorption and vaporization are involved. In the separations that are disclosed herein, hydrocarbon liquid phases were used; however, where applicable, nonhydrocarbon liquid phases can be used or the liquid can be eliminated completely.

The disclosed ligands may be replaced by others that provide chelates that are volatile and stable at the temperatures required for a desired elution. Fluorine or other species are included in the ligand to impart improved volatility.

The general structure:

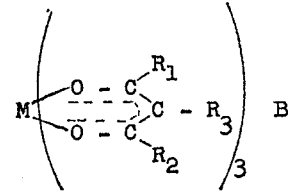

wherein M is metal; B represents donor groups such as H$_2$O, organic bases, etc., R$_1$, R$_2$, and R$_3$ are selected from the group that consists of —C(CH$_3$)$_3$, —CF$_3$, —CF$_2$CF$_3$, —CF$_2$CF$_2$CF$_3$, and higher homologues, H, C(CH$_2$)$_x$H or branched chain analogs or their fluorinated derivatives. This general formula structure describes the types of compounds to which the process can be applied. A specific example of such a derivative is tris(1,1,1,2,2,3,3-heptafluoro-7,7-dimethyl-4,6-octanedionato) Eu(III).

It is to be understood that the process steps that are disclosed herein are submitted as being successfully operative embodiments of the present invention and that limited modifications in the process steps and substitutions of equivalents in the compositions and metals stipulated may be made without departing from the spirit and the scope of the present invention.

We claim:
1. The process of separating rare earth elements selected from the group consisting of Sc, Y, La, Ce, Pr, Nd, Sm, Eu, Gd, Tb, Dy, Ho, Er, Tm, Yb, Lu and Pm by gas-liquid chromatography comprising the steps of reacting each of the above elements with the organic ligand 2,2,6,6-tetramethyl-3,5-heptanedione to produce a chelate that is stable in its vapor phase, dissolving the chelate in an organic solvent, introducing the solution of the chelate into the injection port of a gas-liquid chromatograph and removing from the chromatograph the separated chelates.

2. The process of claim 1 in which the solvent is benzene.

References Cited

UNITED STATES PATENTS 3,254,103  5/1966  Melby et al. _____ 260—429.2

OTHER REFERENCES

Moshier et al., Gas Chromatography of Metal Chelates, Per Gamon Press, New York 1965 pp. 26–28, 46–51.

CARL D. QUARFORTH, *Primary Examiner.*

MICHAEL J. McGREAL, *Assistant Examiner.*